INVENTOR
TAGE G. PERSSON
BY Kenwood Ross
ATTORNEY

April 8, 1969
T. G. PERSSON
3,437,008
SHEET METAL DEBURRING APPARATUS
Filed May 10, 1967
Sheet 2 of 2
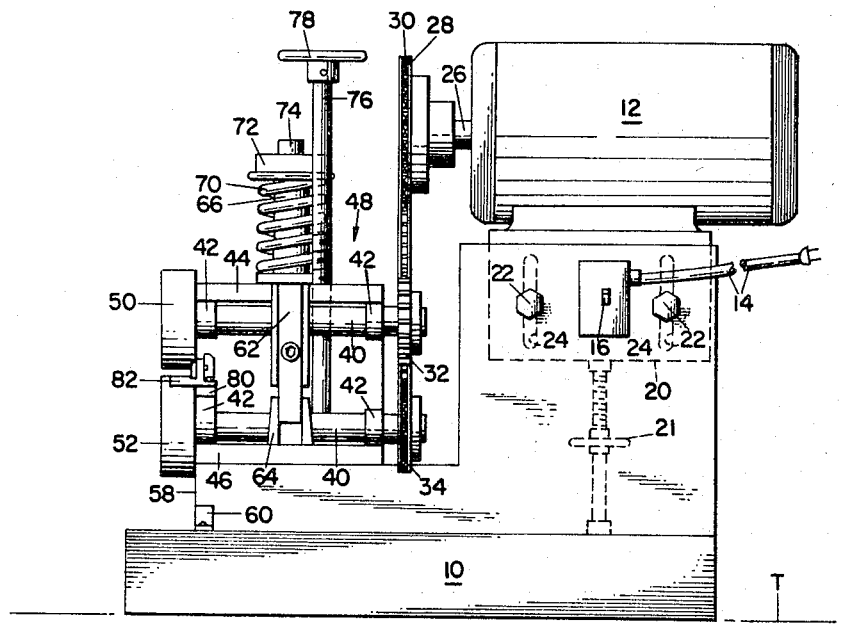
FIG. 3.
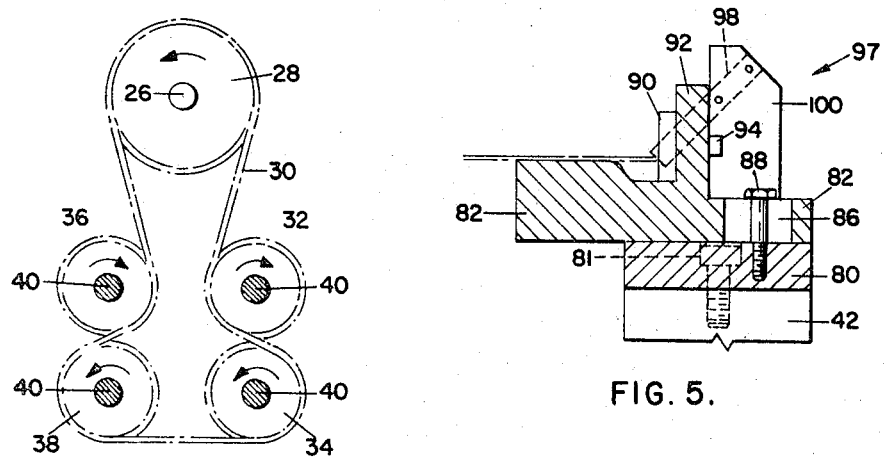
FIG. 4.
FIG. 5.
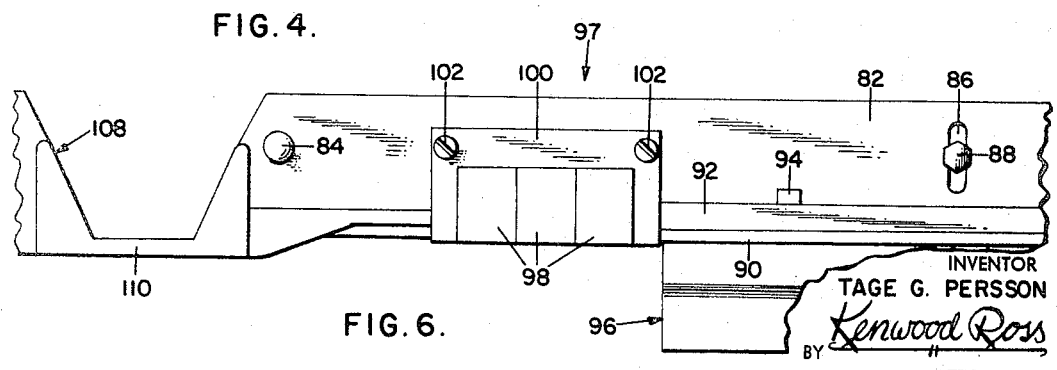
FIG. 6.
INVENTOR
TAGE G. PERSSON
BY Kenwood Ross
ATTORNEY

United States Patent Office 3,437,008
Patented Apr. 8, 1969

3,437,008
SHEET METAL DEBURRING APPARATUS
Tage G. Persson, 2 Henry St., Bloomfield, N.J. 07003
Filed May 10, 1967, Ser. No. 637,410
Int. Cl. B23d 1/20
U.S. Cl. 90—24                            5 Claims

ABSTRACT OF THE DISCLOSURE

Apparatus for removing burrs from the edges of a workpiece comprising pairs of rollers for feeding the workpiece along a gate to and past a stationary cutting tool having one or more cutting edges and to and past a rotating tool in the nature of a wire brush for removing any burrs left by the first cutting tool, the spacing between the rollers being infinitely variable to accommodate various stock sizes and the rollers being spring-loaded.

BACKGROUND OF THE INVENTION

Field of the invention

Apparatus wherein burrs or sharp edges are removed from a workpiece by moving the workpiece past a stationary cutter.

Description of the prior art

It has been known to remove the burred or sharp edges from a workpiece by such means as filing, grinding or the like, but such methods do not offer uniform results and are often costly and difficult to practice.

SUMMARY OF THE INVENTION

A primary object of my invention is to provide simple and compact deburring apparatus incorporating means for advancing a workpiece to a stationary cutting tool which removes the burrs as the material is fed therepast at a set pressure which is not likely to scratch or scar or otherwise deface the main surface or finish of the workpiece, and for advancing the workpiece to a finishing tool which removes any burrs which may have been left by the stationary cutting tool.

Another object is to provide a workpiece feeding means which is adjustably spring loaded whereby the apparatus may accommodate workpieces of varying thicknesses.

BRIEF DESCRIPTION OF THE DRAWINGS

FIG. 3 is a view in end elevation thereof;
FIG. 4 is a view in schematic form of the drive train of the apparatus of the invention;
FIG. 5 is a fragmentary enlarged view in cross section of the gate and stationary cutting tool of the apparatus of the invention;
and
FIG. 6 is a fragmentary view in top plan of the gate of FIG. 5 with parts omitted for clarity.

DESCRIPTION OF THE PREFERRED EMBODIMENTS

Figure 1:
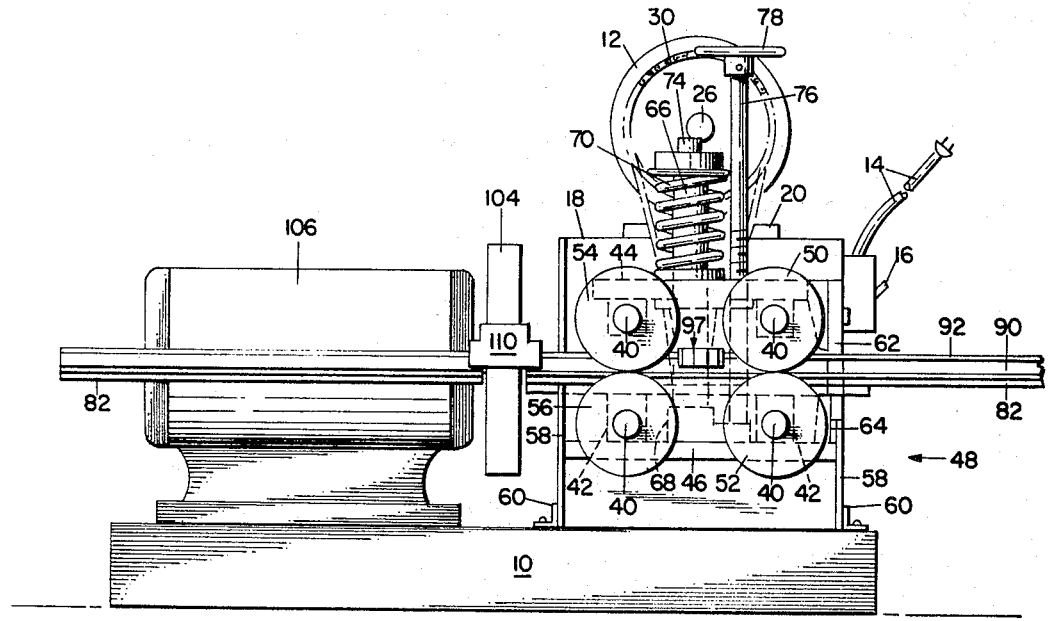
FIG. 1 is a view in front elevation of sheet metal deburring apparatus embodying my invention.
Figure 2:
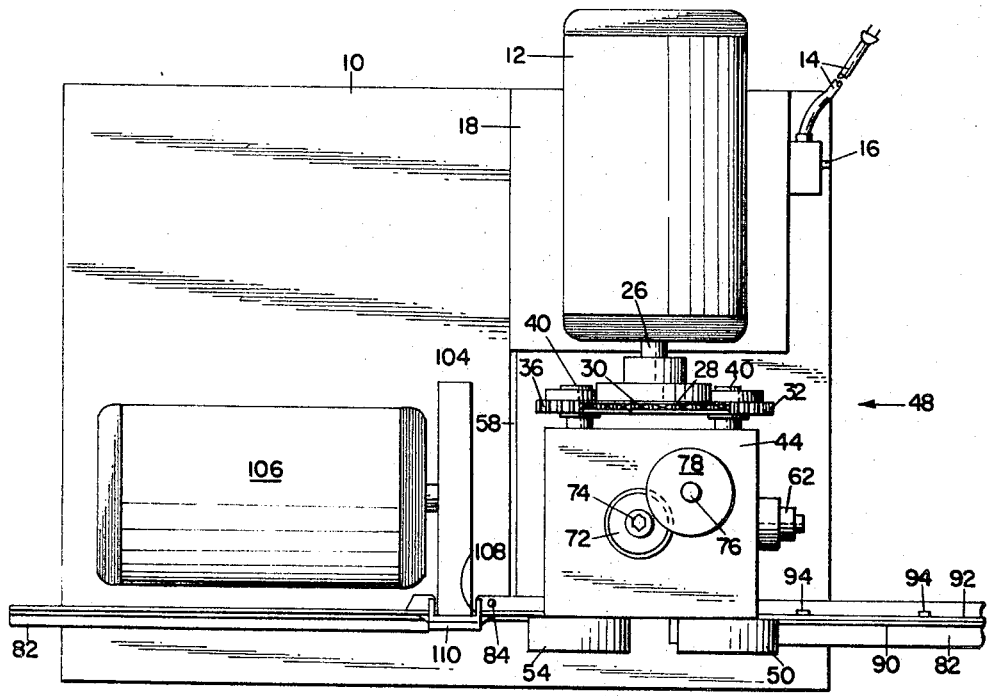
FIG. 2 is a view in top plan thereof.

With detailed reference now to the drawings, my sheet metal deburring apparatus generally comprises a gate means for supporting a workpiece and feed means for feeding the workpiece to a tool or tools for performing an initial deburring operation on the workpiece, and to a tool preferably in the form of a steel wire brush for performing a final deburring operation on the workpiece.

A bed plate or base 10 supports the apparatus upwardly of a table or workbench T.

A motor 12 powered through an electric line 14 and controlled by a switch 16 is supported upwardly of base 10 by a platform 18. The motor is mounted upon a base 20 which is vertically positionable relative to the platform by a jack means 21. Bolts 22 which extend inwardly from the side walls of the platform and through vertically-extending slots 24 in the side walls of motor base 20 and having nuts, not shown, threaded on their inner ends lock the base relative to the platform.

The motor drive shaft 26 carries a main sprocket 28. A chain 30 is entrained around sprocket 28, around a first pair of vertically-spaced, aligned, upper and lower auxiliary sprockets 32 and 34 respectively and around a second pair of vertically-spaced, aligned, upper and lower auxiliary sprockets 36 and 38 respectively in the manner shown in FIG. 4. Of course, a gearing or belt arrangement could be used in lieu of the sprocket and chain arrangement shown.

The pairs of auxiliary sprockets are fixed to the inner ends of horizontally-extending shafts 40 journalled in pillow blocks 42 provided on upper and lower platforms 44 and 46 respectively of a roller housing generally indicated by 48.

Fixed to the outermost ends of shafts 40 are a first pair of vertically-spaced, aligned, upper and lower rollers 50 and 52 and a second pair of vertically-spaced, aligned, upper and lower rollers 54 and 56, the pairs of rollers being in the same horizontal and vertical planes.

Lower platform 46 is fixed to side walls 58 of the roller housing, said side walls being secured to base 10 by brackets 60 or equivalent.

A guide post 62 is fixed at its upper end to a side wall of upper platform 44 and depends vertically therefrom, its lower end being slidably receivable in a slotted bracket 64 fixed to and extending vertically-upwardly from lower platform 46. By this arrangement, housing 48 remains stationary during movement of the workpiece past the rollers and will not pivot.

A shaft 66 is journalled in a bearing 68 provided on lower platform 46 and extends vertically-upwardly therefrom through a provided opening in upper platform 44.

A compression spring 70 is sleeved upon the upper end of shaft 66 which is capped by a cap 72 fixed to the shaft by a bolt 74. Appropriate rotation of the bolt increases or decreases the pressure of the cap on the spring thereby maintaining constant spacing between the pairs of rollers.

Means for effecting the movement of upper platform 44 relative to lower platform 46 comprises a jack screw 76 journalled at its lower end in bearing 68 and extending vertically-upwardly therefrom through a threaded opening provided in upper platform 44, the jack screw having a handle 78 fixed to its upper end for facilitating its rotation.

The jack screw permits incremental adjustments of the spaces between the upper and lower rollers of each pair.

A gate assembly, best seen in FIGS. 5 and 6 comprises a horizontally extending support bar 80 disposed upwardly of base 10 and inwardly of the pairs of rollers and fixed to the pillow blocks 42 on lower platform 46 by bolts 81.

A gate 82 is disposed on the upper surface of support bar 80. A pivot pin 84 extends downwardly through the gate and support permitting horizontal rotation of the gate. A slot 86 is provided in the gate in horizontally-spaced relation to the pivot pin, the slot overlying a threaded opening in the support bar. A bolt 88 extends through the slot and is threaded in the opening in the support bar.

When bolt 88 is loosened, the gate may be rotated relative to the support bar to the desired position of adjustment whereupon the bolt is tightened to lock the gate relative to the support bar.

Since the gate carries the cutting tool, to be described, it is highly desirable to incorporate an adjustable gate whereby the workpiece will be positively guided by the rollers to the cutting tool.

A hardened wear plate 90 is fixed to a forwardly facing upstanding wall 92 of the gate by bolts 94.

A cutter opening 96 is provided in wall 92 of the gate, said opening being positioned centrally between the pairs of rollers.

A cutter subassembly generally indicated by 97 comprises a cutter or cutters 98 secured in a mounting block 100 fixed to the gate as by bolts 102, the cutter extending angularly outwardly from the mounting block through the cutter opening in the gate so as to have its cutting edge disposed in the path of the workpiece being moved along and relative to wear plate 90.

Cutter 98 performs the initial deburring operation on the edge of the workpiece.

However, a slight burr may remain on the edge and this burr is removed by a second deburring operation performed by a wire wheel 104 driven by a motor 106 mounted on base 10 adjacent housing 48.

A suitable opening 108 is provided in the gate to permit the periphery of the wheel to extend into the path of the workpiece.

A hold-down tool 110 bridges this opening to preclude upward movement of the workpiece.

In operation, the workpiece is moved along the gate to the first pair of rollers where it is gripped by the rollers, moved past the cutter for the first deburring operation, gripped by the second pair of rollers and moved to the wire wheel for the second deburring operation.

I claim:

1. Sheet metal deburring apparatus for removing burrs from the edges of a workpiece comprising:
    (a) a housing;
    (b) pairs of rollers mounted for rotation relative to said housing;
    (c) drive means for rotating the rollers;
    (d) a gate subassembly fixed to and adapted for limited horizontal rotative movement relative to said housing;
    (e) a cutter subassembly fixed to the gate subassembly; and
    (f) a finishing tool mounted for rotation relative to the gate subassembly;
    (g) one pair of said rollers feeding the workpiece along the gate subassembly to and past the cutter subassembly for removing burrs from the workpiece and the other pair of said rollers moving the workpiece to and past the finishing tool for performing a final deburring operation thereon.

2. Sheet metal deburring apparatus according to claim 1 including means for infinitely varying the spacing between the rollers of each said pair and for varying the pressure exerted by said rollers on the workpiece.

3. Sheet metal deburring apparatus according to claim 1 wherein said housing comprises top and bottom members and includes means for holding the two members in vertical alignment.

4. Sheet metal deburring apparatus according to claim 1 wherein said cutter subassembly comprises a plurality of cutting tools presenting a plurality of cutting edges to the workpiece.

5. Sheet metal deburring apparatus according to claim 1 wherein said finishing tool is a wire brush.

References Cited

UNITED STATES PATENTS

| | | | |
|---|---|---|---|
| 1,439,370 | 12/1922 | Lambert | 90—24 |
| 2,277,740 | 3/1942 | Yoder | 90—24 |
| 2,318,732 | 5/1943 | Yoder | 90—24 |
| 2,327,407 | 8/1943 | Edyvean | 90—24 |
| 2,503,476 | 4/1950 | Glover | 90—24 |

GERALD A. DOST, *Primary Examiner*.